Figure 1:
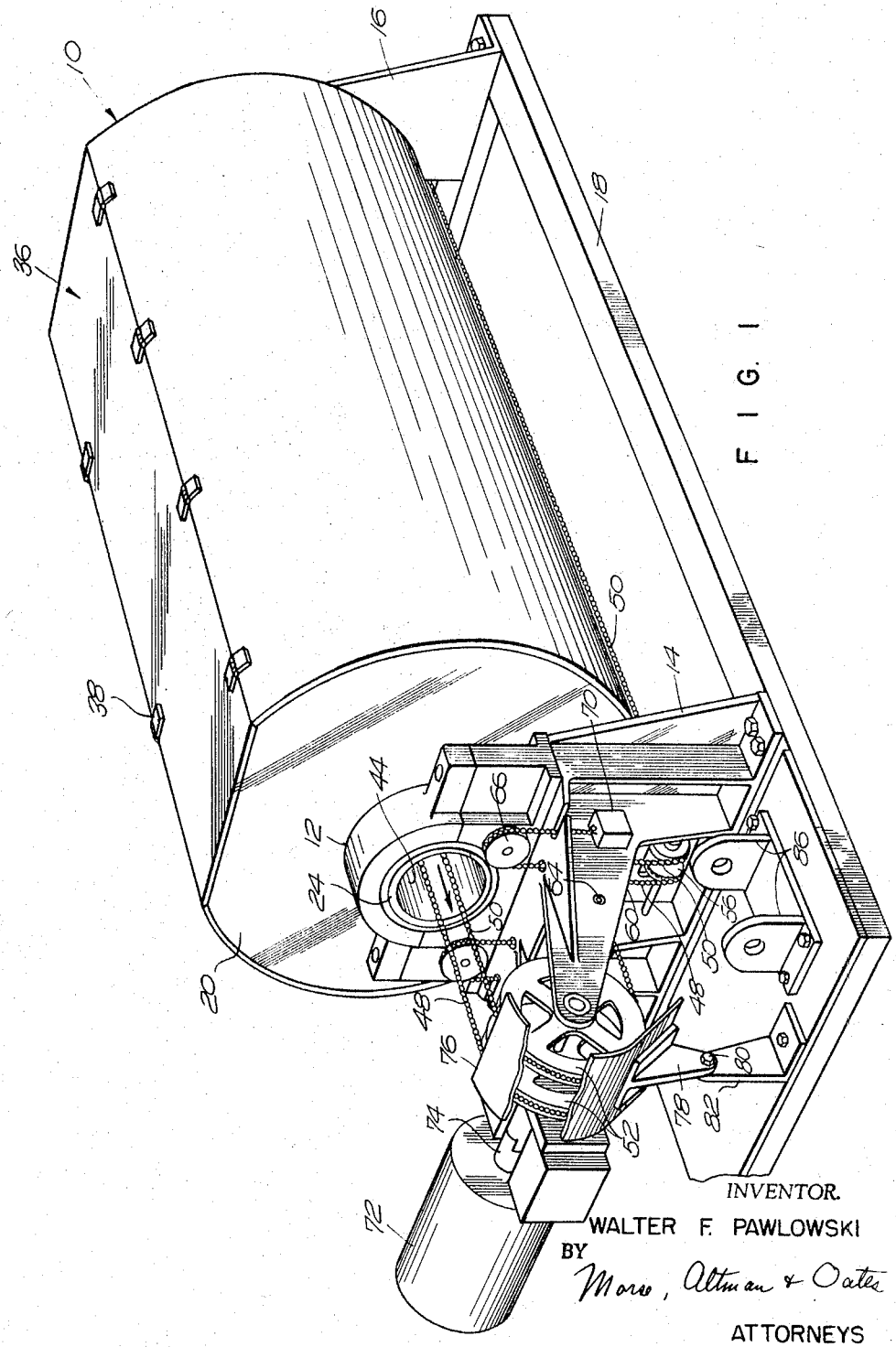

Jan. 10, 1967   W. F. PAWLOWSKI   3,297,131
PARTS FEEDER
Filed Dec. 21, 1964   4 Sheets-Sheet 1

INVENTOR.
WALTER F. PAWLOWSKI
BY Morse, Altman & Oates
ATTORNEYS

Jan. 10, 1967 W. F. PAWLOWSKI 3,297,131
PARTS FEEDER

Filed Dec. 21, 1964 4 Sheets-Sheet 3

INVENTOR.
WALTER F. PAWLOWSKI
BY Morss, Altman & Oates

ATTORNEYS

INVENTOR.
WALTER F. PAWLOWSKI
BY
Morse, Altman & Oates
ATTORNEYS 3,297,131
PARTS FEEDER
Walter F. Pawlowski, Holbrook, Mass., assignor to Thermoplastic Industries, Inc., Brockton, Mass., a corporation of Massachusetts
Filed Dec. 21, 1964, Ser. No. 419,827
3 Claims. (Cl. 198—33)

This invention relates generally to part feeders and more particularly is directed towards a novel high-speed, high-capacity feeding apparatus for delivering uniformly oriented like components from a randomly distributed mass of components.

Automatic parts feeders are widely used in mass-production operations as a means for delivering components from a random supply to a desired position such as an assemly station or the like. While part feeders currently available are capable of delivering components one by one from a randomly distributed supply, they are relatively slow in operation and have a limited capacity whereby the supply of components must be recharged at frequent intervals.

Accordingly, it is an object of the present invention to provide improvements in part feeders.

Another object of this invention is to provide a high-speed, high-capacity apparatus for delivering a flow of properly oriented components from a randomly distributed supply of components.

Still another object of this invention is to provide a relatively simple, low-cost, yet efficient apparatus for feeding at a high volume like components of various sizes and shapes in a properly oriented position from a supply container to a predetermined station.

More particularly, this invention features a parts feeder comprising a drum container rotatable about a horizontal axis and adapted to contain a relatively large supply of parts. A pair of spaced parallel belts are mounted to move continuously through the axis of the rotating container and a plurality of baffles are mounted to the inner walls of the container for picking up a quantity of the parts and dropping them down onto the top of the belts where a portion of them are caught and carried axially out of the container to a predetermined station.

This invention also features means for orienting parts deposited on the belts all in the same direction. As a further feature of this invention the baffles within the contaner are arranged in staggered relation along the length of the container and are evenly spaced apart about the circumference of the container whereby parts will be deposited along the entire length of the belts in a continuing manner.

Figure 2:
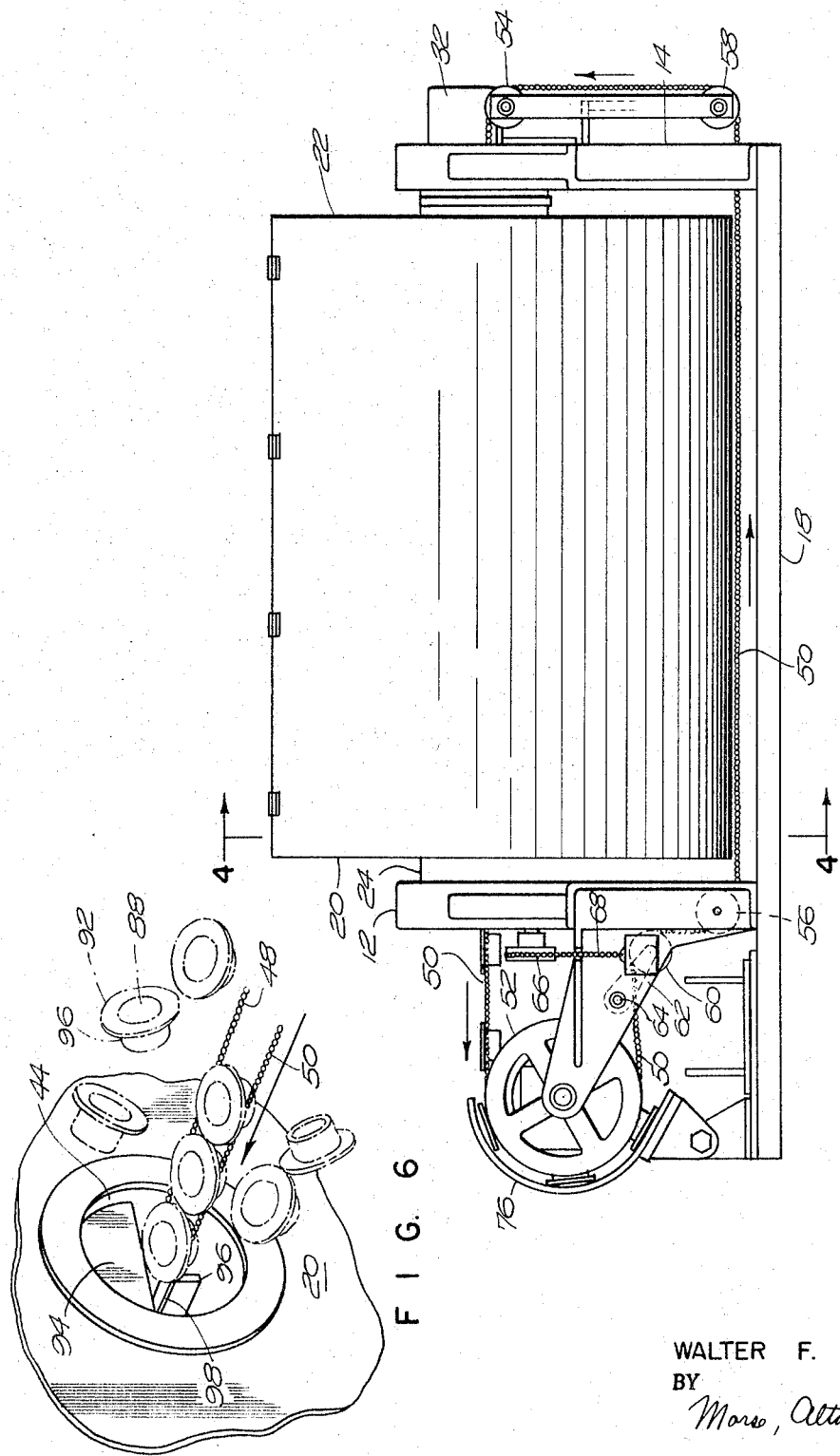
Figure 3:
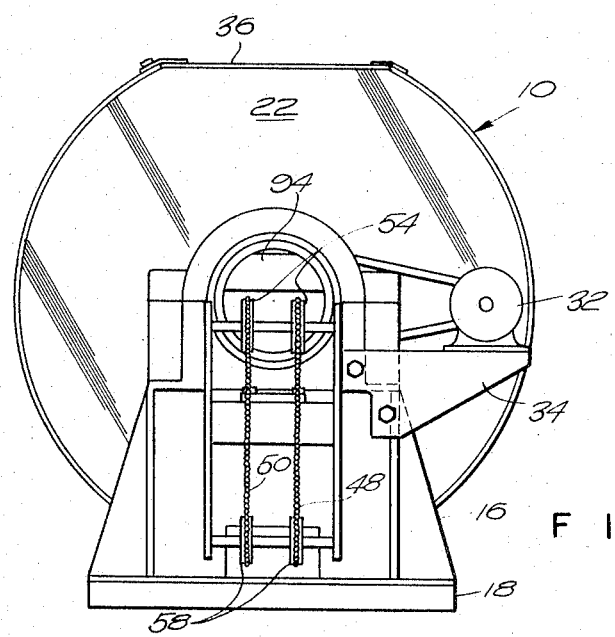
Figure 4:
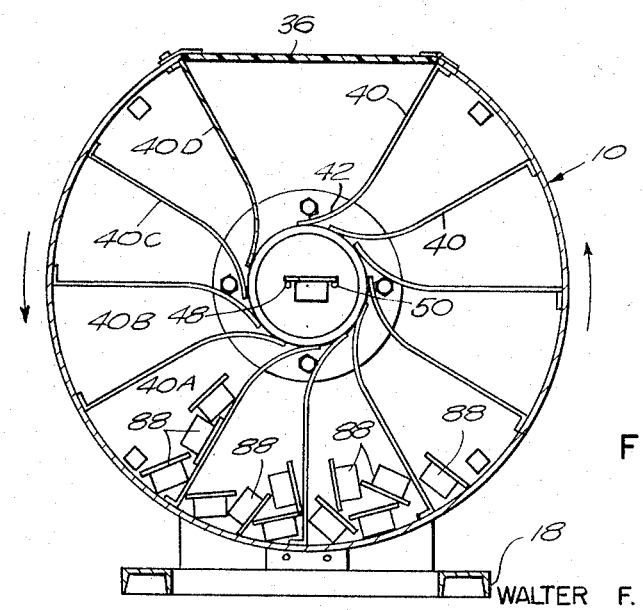
Figure 5:
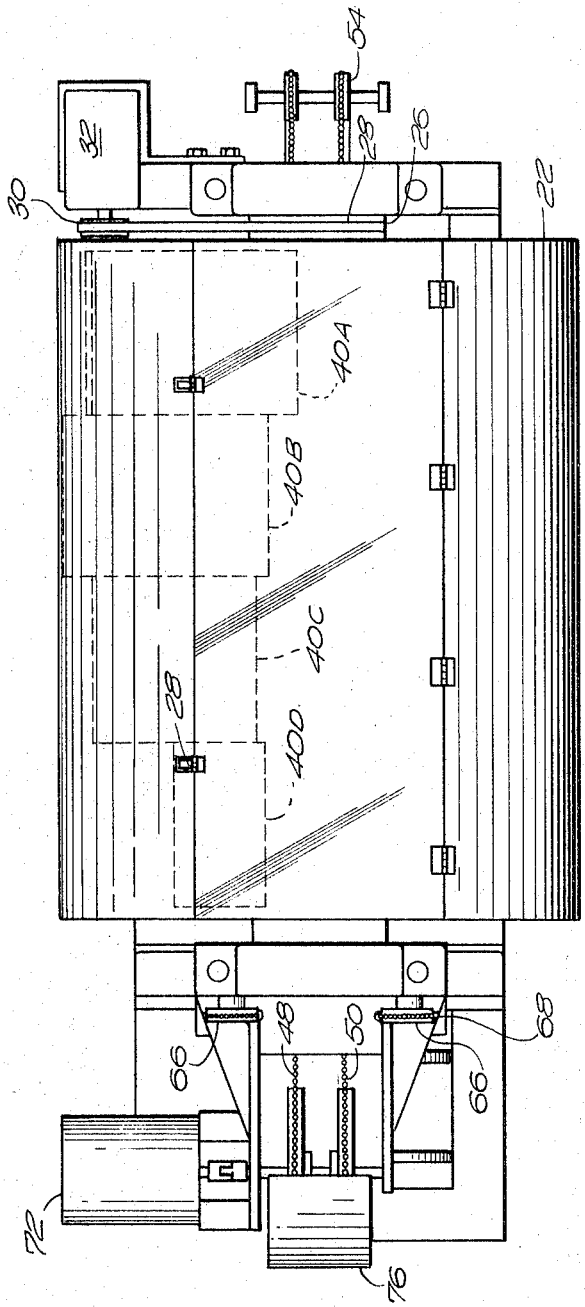

However, these and other features of the invention, along with further objects and advantages thereof, will become more fully apparent from the following detailed description of a preferred embodiment of the invention, with reference being made to the accompanying drawings, in which:

FIG. 1 is a view in perspective of a parts feeder made according to the invention, FIG. 2 is a view in side elevation of the feeder, FIG. 3 is a view in end elevation of the feeder, FIG. 4 is a cross-sectional view taken along the line 4—4 of FIG. 2, FIG. 5 is a top-plan view of the feeder, and, FIG. 6 is a detail perspective showing the interior delivery end of the feeder.

Referring now to the drawings, the feeder is generally organized about a drum 10 rotatably supported at its ends by trunions 12 and 14 carried by standards 14 and 16 mounted on a base 18. The generally cylindrical drum 10 is provided with annular end walls 20 and 22 with each end wall carrying a collar 24 which is received in the trunion bearings. As best shown in FIGS. 3 and 5 the collar 24 for the end wall 22 is formed as a pulley 26 over which is looped a belt 28 which is also looped over a pulley 30 driven by a motor 32. The motor 32 is mounted on a bracket 34 carried by the standard 16. It will thus be understood that operation of the motor 32 will rotate the drum 10 about a horizontal axis for reasons that will presently appear.

The drum 10 is provided with a hinged hatch or cover 36 along one wall thereof. Alternatively, the drum may be loaded axially through an opening in the end wall 22, for example. Preferably the hatch 36 is fabricated from a transparent material such as acrylic plastic or the like and is provided with a suitable latch 38 whereby the cover may be secured in place. The object of fabricating the cover from a transparent material is to permit visual observation of the supply of parts within the drum while the feeder is operating.

Mounted to the inner cylindrical walls of the drum 10 is a plurality of vanes or baffles 40 which extend radially towards the center of the drum but having their inner free ends curved as at 42 along lines which are generally tangential to openings 44 and 46 formed in the end walls 20 and 22 respectively. As best shown in FIG. 4 the vanes 40 are all curved in the same rotary direction and are spaced apart about the drum 10. In practice, the vanes 40 comprise three banks of vanes set 120° apart with four vanes in each bank set 30° apart. As shown in FIG. 5 a single bank of four vanes comprises individual vanes 40a, 40b, 40c and 40d with the vanes in each bank being 30° from the next axially adjacent vane.

Extending through the drum openings 44 and 46 to either side of the drum axis is a pair of bead chains 48 and 50 arranged in spaced parallel relation to one another. A pair of bead sprocket pulleys 52 and 54 are rotatably mounted at either end of the drum 10 and are supported by the standards 14 and 16 respectively. The pulleys in each pair are mounted in spaced coaxial relation. As best shown in FIG. 2, the centerline of the drum is substantially tangent to the top portions of the two pairs of sprocket pulleys 52 and 54 and the bead chains 48 and 50 are looped over the two pairs of pulleys. The endless bead chains are then carried down underneath the drum and carried about pairs of idler pulleys 56 and 58 mounted at either end of the drum and supported by the standards 14 and 16.

In order to maintain a constant tension on the bead chains a pair of tensioning pulleys 60 is provided at the left-hand end of the apparatus as viewed in FIG. 2. The tensioning pulleys are rotatably mounted on the free end of swinging arms 62 pivoted to the standard frame 14 about pivot pins 64. Mounted above the pulleys 60 and at right angles thereto is a pair of pulleys 66 over each of which is looped a length of bead chain 68 connected at one end to the swinging arm 62 and at the other end to a weight 70. It will thus be understood that the weight 70 will apply an upward pressure to the pulley 60 over which the bead chains 48 and 50 are looped to thus maintain a constant tension on the two endless chains.

As best shown in FIG. 1 the pair of sprocket pulleys 52 are driven by a motor 72 mounted to one side of the standard 14 and drivingly coupled to the pulleys 52 by means of a shaft 74. Thus, operation of the motor 72 will serve to feed the endless bead chains 48 and 50 continuously through the open axial center of the drum 10. Associated also with the pair of sprocket pulleys 52 is a curved guide plate 76 spanning an arc of both of said sprocket pulleys as shown in FIG. 1. This guide plate has a straight lower portion to which is attached bracket 78 secured by a bolt 80 to a fixed support 82.

The curved upper portion of the guide plate is normally arranged in spaced relation to the periphery of the sprocket pulleys 52 and 54 defining an arcuate gap 84 between the pulleys 52 and 54 and the guide plate 76 over an arc of about 100° between the tops of the sprocket pulleys and the bottoms thereof. It will be understood that the gap 84 may be varied by adjustment of the bolt 80 so as to move the guide plate to or away from the sprocket pulleys. In some instances, it may be desirable to swing the guide plate entirely away from the sprocket pulleys for servicing or the like and this may be done by merely loosening the bolt and rotating the guide plate counterclockwise as viewed in FIG. 2.

In practice, a conveyor system, not shown, normally runs below the forward or discharge end of the drum at a point directly below the discharge of the sprocket pulleys and guide plate. For this purpose, brackets 86 are provided for mounting a roller over which a conveyor belt may be roven to pick up individual parts fed thereon by the feeder.

The feeder operates in the following manner. Initially, with the apparatus shown in the rest position of FIG. 1, a supply of parts, such as nozzles 88 for example, is dumped into the drum through the opening normally covered by the hatch 36. With a supply of these nozzles within the drum, the hatch cover is secured and the motor 32 is energized to start the drum rotating about its longitudinal horizontal axis. The motor 72 is also energized to start the bead chains 48 and 50 moving through the center of the drum. The particular nozzles illustrated are of the sort used in various types of valve bags and the like. Typically the nozzles are fabricated from plastic and characterized by a tubular spout 90 and a flanged base 92. The nozzles which are deposited in the drum collect in groups in a more or less random distribution between vanes 40 as suggested in FIG. 4. As the drum rotates the vanes carry groups of these nozzles in a counterclockwise direction as viewed in FIG. 4. As a particular vane approaches a high point, the nozzles start sliding downwardly and inwardly towards the center of the drum. At a certain point near the top of the rotary movement of the drum the nozzles will drop off the curved end of the vane and down onto the moving the bead chains 48 and 50 located directly below the free end of the vanes. Some of the nozzles dropped onto the moving bead chains will fall off and drop to the bottom of the drum where they will again be carried up by another vane and dropped down onto the chain again. Others will fall so that their spouts 90 will drop down directly between the two bead chains 48 and 50 and will be held there by their flanged base 92 spanning the two bead chains in the manner illustrated. Spouts caught in this position will be carried out of the drum through the opening 24, over and around the sprocket pulleys 52 and 54 through the gap 84 formed with the guide plate 76 and thence discharged onto the conveyor located therebelow. Other nozzles which drop onto the bead chains may be inverted so that the spout portion 90 is facing upwardly. Since nozzles in this position cannot be accommodated by the gap 84 and since the position is opposite to the desired position a clearing plate 94 is mounted across the upper portion of the drum discharge opening 44. Thus, any nozzles which happen to be caught in an inverted position by the bead chains will be knocked off the bead chains by the clearing plate 94 as the spout portion strikes the clearing plate when the nozzle is carried towards the exit. With this arrangement, only these nozzles which are suspended between the two bead chains in the manner illustrated in FIG. 4 will be carried out of the drum, thus all discharged nozzles will be in proper position for delivery to the conveyor.

As best shown in FIG. 6, a pair of guide rails 96 are mounted in the mouth of the opening 44 and are formed with longitudinal shoulders 98 along which the bead chains 48 and 50 ride. The function of the rails is to support the bead chains and to maintain the bead chains in the proper spaced relation particularly at the discharge end of the drum where the clearing plate 94 is mounted. Thus, the clearing plate and the rails cooperate to insure that only properly positioned nozzles are carried out of the drum.

In place of the clearing plate, an air nozzle (not shown) may be mounted near the discharge end of the drum. Continuous or pulsed air jets could be delivered from the nozzle to clear the conveyor of any parts not in a proper position.

While the feeder has been described with particular reference to nozzles of the sort illustrated, it will be understood that numerous ather components may also be fed by the parts feeder with only small changes in dimensions and shapes to accommodate parts of a particular size or configuration. The feeder has a substantially greater capacity than other types of parts feeders, also is able to feed parts at a much faster rate than other feeders and will accommodate a reasonable quantity of larger parts not satisfactorily handled by conventional feeders. The drum may be viewed while it is running to check on a supply of parts therein and one operator may easily service a large number of feeders since each feeder, by reason of its large capacity, need be refilled only at relatively long intervals whereas most of the currently available parts feeders have but a relatively small capacity and must be reloaded at frequent intervals.

The apparatus is relatively simple requiring only nominal maintenance and may be fabricated and assembled at a relatively low cost.

While the invention has been described with particular reference to the illustrated embodiment, it will be understood that numerous modifications thereto will appear to those skilled in the art. Accordingly, the above description accompanying drawings should be taken as illustrative of the invention and not in a limiting sense.

Having thus described the invention, what I claim and desire to obtain by Letters Patent of the United States is:

1. A parts feeder, comprising
   (a) a generally cylindrical drum adapted to hold a quantity of said parts and mounted for rotation about a generally horizontal axis,
   (b) conveyor means mounted for movement through said container and generally along said axis,
   (c) a plurality of spaced inwardly extending radial vanes mounted to the inner walls of the said contained and generally parallel to said axis,
   (d) said vanes being arranged in angularly spaced groups about the drum, each group comprising a number of axially staggered, angularly spaced vanes whereby rotation of said drum will cause said vanes to carry at least some of said parts from a position below said conveyor means to a position above said conveyor means whereby said parts will be deposited sequentially along the length of said conveyor means for delivery out of said container.

2. A parts feeder according to claim 1 wherein said conveyor means comprises a pair of endless belts one portion of said belts extending through said drum from end to end thereof substantially along said axis and another portion of said belts extending externally from one end of the drum to the other.

3. Apparatus for feeding parts characterized by a flanged portion, comprising
   (a) a drum adapted to hold a quantity of said parts and mounted for rotation about a generally horizontal axis,
   (b) a pair of parallel horizontally spaced conveyor belts mounted for movement through said drum generally along said axis, (c) a plurality of inwardly extending radial vanes mounted to the inner walls of said drum whereby upon rotation of said drums said vanes will carry at least some of said parts from a position below said conveyor belts to a position above said belts whereby said parts will be deposited on said belts and carried by said flanged portions for delivery out of said drum, (d) a pair of pulleys rotatable about a horizontal axis perpendicular to the drum axis and each engaging one of said conveyor belts, (e) said pulleys being located outwardly of said drum for changing the direction of travel of said belts from a forward direction along the drum axis to a rearward direction and arcuate guide means disposed in closely spaced relation about a portion of the peripheries of said pulleys for retaining said parts on said belts through said change of direction whereby said parts will be inverted.

References Cited by the Examiner

UNITED STATES PATENTS

| | | | |
|---|---|---|---|
| 1,260,518 | 3/1918 | Currier | 221—156 |
| 2,252,498 | 8/1941 | Flaws | 198—33 X |
| 2,920,740 | 1/1960 | Whitted | 198—33 |
| 2,972,433 | 2/1961 | Knoche | 221—160 |
| 3,204,750 | 9/1965 | Tarzain | 198—33 |

FOREIGN PATENTS 1,055,615  10/1963  France.

EVON C. BLUNK, *Primary Examiner.*

EDWARD A. SROKA, *Examiner.*